United States Patent
Zhong et al.

(10) Patent No.: US 10,989,548 B2
(45) Date of Patent: Apr. 27, 2021

(54) SYSTEMS AND METHODS FOR DETERMINING ESTIMATED TIME OF ARRIVAL

(71) Applicant: BEIJING DIDI INFINITY TECHNOLOGY AND DEVELOPMENT CO., LTD., Beijing (CN)

(72) Inventors: Xiaowei Zhong, Beijing (CN); Ziteng Wang, Beijing (CN); Zheng Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 209 days.

(21) Appl. No.: 16/209,924

(22) Filed: Dec. 4, 2018

(65) Prior Publication Data

US 2019/0107404 A1 Apr. 11, 2019

Related U.S. Application Data

(63) Continuation of application No. PCT/CN2017/088089, filed on Jun. 13, 2017.

(51) Int. Cl.
*G01C 21/34* (2006.01)
*G06F 16/29* (2019.01)
(Continued)

(52) U.S. Cl.
CPC ....... *G01C 21/3446* (2013.01); *G01C 21/343* (2013.01); *G01C 21/3407* (2013.01);
(Continued)

(58) Field of Classification Search
CPC .. G06N 20/00; G01C 21/3446; G01C 21/343; G01C 21/3484; G06Q 10/02
See application file for complete search history.

(56) References Cited

U.S. PATENT DOCUMENTS

2008/0004794 A1 1/2008 Horvitz
2011/0137831 A1 6/2011 Ide et al.
(Continued)

FOREIGN PATENT DOCUMENTS

CN 1871499 A 11/2006
CN 101794396 A 8/2010
(Continued)

OTHER PUBLICATIONS

Notice of Rejection in Japanese Application No. 2018-565792 dated Sep. 17, 2019, 12 pages.
(Continued)

*Primary Examiner* — Thomas G Black
*Assistant Examiner* — Tarek Elarabi
(74) *Attorney, Agent, or Firm* — Metis IP LLC

(57) ABSTRACT

The present disclosure relates to a method and system for determining estimated time of arrival. The method includes receiving a service request including a departure location and a destination from a terminal device; determining a route based on the departure location and the destination; determining a first feature associated with the route; determining a transfer learning model; determining a second feature based on the first feature and the transfer learning model; and determining an estimated time of arrival based on the second feature.

17 Claims, 8 Drawing Sheets

(51) Int. Cl.
*G06N 20/00* (2019.01)
*G06Q 10/02* (2012.01)
*G06Q 30/02* (2012.01)
*G06Q 50/30* (2012.01)
*G08G 1/00* (2006.01)
*G06Q 10/08* (2012.01)

(52) U.S. Cl.
CPC ......... *G01C 21/3484* (2013.01); *G06F 16/29* (2019.01); *G06N 20/00* (2019.01); *G06Q 10/02* (2013.01); *G06Q 10/083* (2013.01); *G06Q 30/0284* (2013.01); *G06Q 50/30* (2013.01); *G08G 1/202* (2013.01)

(56) References Cited

U.S. PATENT DOCUMENTS

| | | |
|---|---|---|
| 2011/0313956 A1 | 12/2011 | Abe et al. |
| 2012/0310534 A1 | 12/2012 | Mizuno et al. |
| 2013/0116882 A1 | 5/2013 | Link, II et al. |
| 2014/0180576 A1 | 6/2014 | Lamarca et al. |
| 2015/0046083 A1 | 2/2015 | Maitra et al. |
| 2015/0168169 A1 | 6/2015 | Caceres et al. |
| 2016/0313134 A1 | 10/2016 | Eom |
| 2017/0138751 A1 | 5/2017 | Martyniv et al. |
| 2018/0017405 A1 | 1/2018 | Chen et al. |
| 2018/0209808 A1* | 7/2018 | Wang .................. G01C 21/3617 |
| 2018/0225796 A1* | 8/2018 | Liu ........................ G06Q 50/30 |

FOREIGN PATENT DOCUMENTS

| | | |
|---|---|---|
| CN | 101995253 A | 3/2011 |
| CN | 102081859 A | 6/2011 |
| CN | 103956043 A | 7/2014 |
| JP | 200232889 A | 1/2002 |
| JP | 2003208698 A | 7/2003 |
| JP | 2007140745 A | 6/2007 |
| TW | 201719561 A | 6/2017 |
| WO | 0223507 A2 | 3/2002 |

OTHER PUBLICATIONS

Examination Report in Australian Application No. 2017417171 dated Oct. 25, 2019, 6 pages.
The Extended European Search Report in European Application No. 17912344.3 dated Jul. 1, 2019, 11 pages.
Examination Report in Canadian Application No. 3027062 dated Feb. 18, 2019, 5 pages.

* cited by examiner

SYSTEMS AND METHODS FOR DETERMINING ESTIMATED TIME OF ARRIVAL

CROSS-REFERENCE TO RELATED APPLICATIONS

This present application is a continuation of International Application No. PCT/CN2017/088089, filed on Jun. 13, 2017, designating the United States of America, the contents of which are hereby incorporated by reference.

TECHNICAL FIELD

The present disclosure generally relates to systems and methods for determining estimated time of arrival, and in particular, systems and methods for determining estimated time of arrival based on machine learning.

BACKGROUND

On-demand transportation services utilizing Internet technology, such as online taxi-calling services, have become increasingly popular because of their convenience. In an on-demand transportation service, after determining a departure location and a destination, a service requester may want to know an estimated time of arrival (ETA) and/or an estimated price. Based on the ETA and/or the estimated price, the service requester can decide whether to send the service request or not. It may be desirable to have a system and method that can provide more accurate ETA and/or the estimated price for the service requester.

SUMMARY

According to an aspect of the present disclosure, a system is provided. The system includes at least one computer-readable storage medium including a set of instructions for managing supply of services. The at least one processor may communication with the at least one storage medium. When executing the set of instructions, the at least one processor is detected to receive a service request including a departure location and a destination from a terminal device. The at least one processor may determine a route based on the departure location and the destination. The at least one processor may determine a first feature associated with the route. The at least one processor may determine a transfer learning model. The at least one processor may determine a second feature based on the first feature and the transfer learning model. The at least one processor may determine an estimated time of arrival based on the second feature.

According to another aspect of the present disclosure, a method is provided. The method is related to a method of determining estimated time of arrival. The method is implemented on at least one device each of which has at least one processor, storage and a communication platform to connect to a network. The at least one processor may receive a service request including a departure location and a destination from a terminal device. The at least one processor may determine a route based on the departure location and the destination, a first feature associated with the route and a transfer learning model. The at least one processor may determine a second feature based on the first feature and the transfer learning model. The at least one processor may determine an estimated time of arrival based on the second feature.

According to another aspect of the present disclosure, a non-transitory machine-readable storage medium may include instructions. When the non-transitory machine-readable storage medium accessed by at least one processor of an online on-demand service platform from a requestor terminal, the instructions may cause the at least one processor to perform one or more of the following operations. The instructions may cause the at least one processor to obtain a request of an on-demand service including a current default service location through a wireless network. The instructions may cause the at least one processor to receive a service request including a departure location and a destination from a terminal device. The instructions may cause the at least one processor to determine a route based on the departure location and the destination. The instructions may cause the at least one processor to determine a first feature associated with the route. The instructions may cause the at least one processor to determine a transfer learning model. The instructions may cause the at least one processor to determine a second feature based on the first feature and the transfer learning model. The instructions may cause the at least one processor to determine an estimated time of arrival based on the second feature.

In some embodiments, the determining of the estimated time of arrival based on the second feature may further comprise one or more operations. The at least one processor may determine a machine learning model. The at least one processor may determine the estimated time of arrival based on the second feature and the machine learning model.

In some embodiments, the determining of the machine learning model may further comprise one or more operations. The at least one processor may obtain a plurality of historical orders. For each of the plurality of historical orders, the at least one processor may determine a second historical route associated with the each of the plurality of historical orders. The at least one processor may determine a second historical feature associated with the second historical route. The at least one processor may determine a historical time of arrival associated with the each of the plurality of historical orders. The at least one processor may train the machine learning model based on the second historical feature, the historical time of arrival associated with the each of the plurality of historical orders and determine the machine learning model based on the training.

In some embodiments, the at least one processor may determine an estimated price based on the second feature.

In some embodiments, the determining of the first estimated price based on the second feature may further comprise one or more operations. The at least one processor may determine a machine learning model. The at least one processor may determine the estimated price based on the second feature and the machine learning model.

In some embodiments, the determining of the machine learning model may further comprise one or more operations. The at least one processor may obtain a plurality of historical orders. For each of the plurality historical orders, the at least one processor may determine a second historical route associated with each of the plurality of historical orders, a second historical feature associated with the second historical route and an historical price associated with each of the plurality of historical orders. The at least one processor may train the machine learning model based on the second historical feature, the historical price associated with each of the plurality of historical orders. The at least one processor may determine the machine learning model based on the training.

In some embodiments, the determining of the route based on the departure location and the destination may further comprise determining the route based on map information.

In some embodiments, the determining of the transfer learning model may further comprise one or more operations. The at least one processor may obtain a plurality of historical orders. For each of the plurality of historical orders, the at least one processor may determine a first historical route associated with the each of the plurality of historical orders. The at least one processor may determine a first historical feature associated with the first historical route, a second historical route associated with the each of the plurality of historical orders, a second historical feature associated with the historical route. The at least one processor may train the transfer learning model based on the first historical feature and the second historical feature and determine the transfer learning model based on the training.

In some embodiments, the first feature associated with the route may include at least one of an order feature, a map feature, a driver feature, or a traffic feature.

In some embodiments, the second feature may include at least one of a location feature, a time feature, a driver feature, or a traffic feature.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
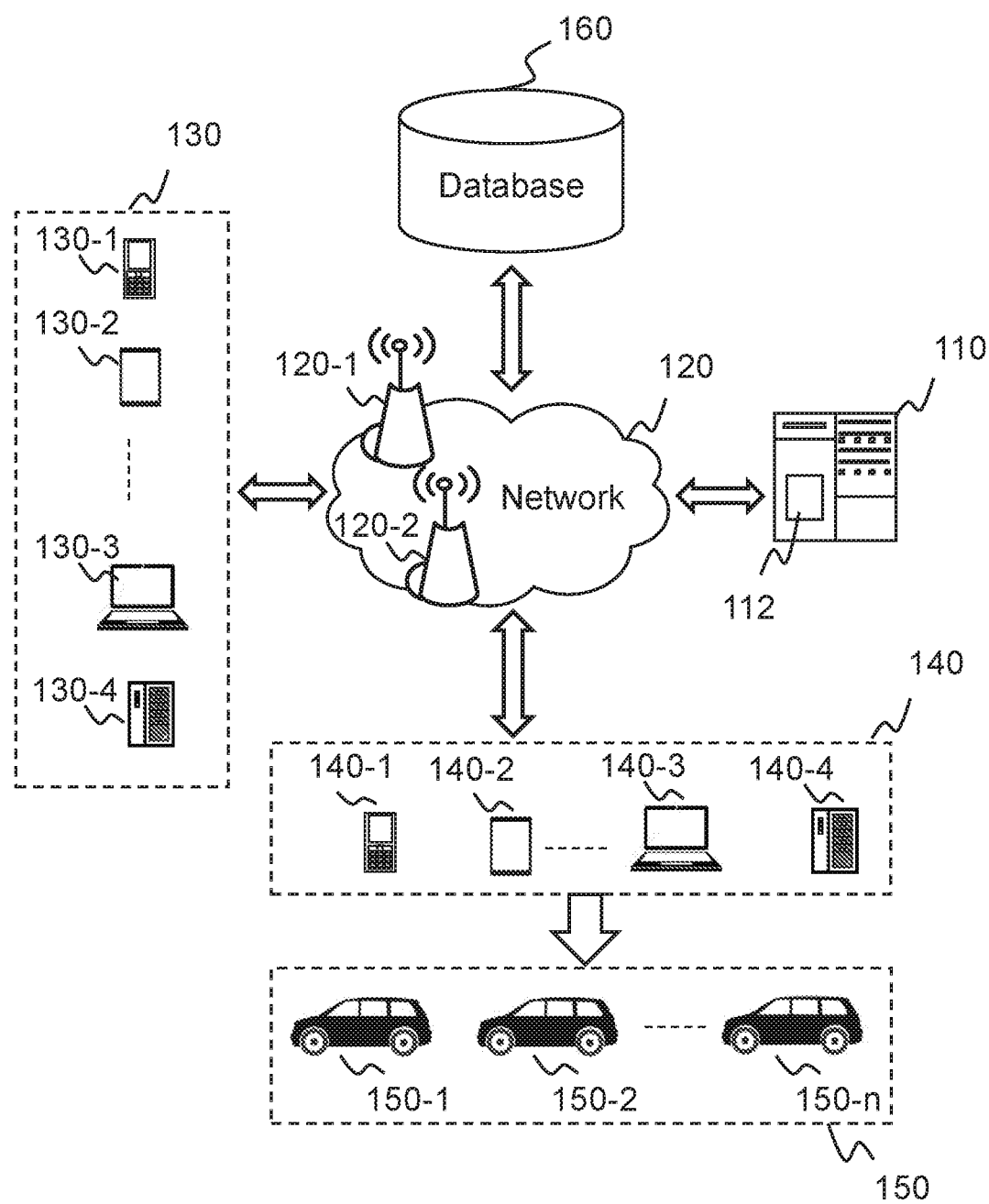
FIG. 1 is a schematic diagram of an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding allocating a set of sharable orders, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express.

The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

According to an aspect of the present disclosure, systems and methods for determining an estimated time of arrival (ETA) are provided. The systems receive a service request from a terminal device. The systems determine a route based on the service request. The systems determine a first feature associated with the route. The systems determine a transfer learning model. The systems determine a second feature based on the first feature and the transfer learning model. The systems determine an ETA and/or an estimated price corresponding to the service request based on the second feature. The systems transmit the ETA and/or the estimated price to the terminal device in response to the service request. The system applies machine learning model and incorporate the second feature to determine the ETA and/or the estimated price. By providing more accurate ETA and/or estimated price, the user experience of the one-deman service is improved.

It should be noted that online on-demand transportation service, such as online taxi-hailing including taxi hailing combination services, is a new form of service rooted only in post-Internet era. It provides technical solutions to users and service providers that could raise only in post-Internet era. In pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatically distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system.

FIG. 1 is a schematic diagram of an exemplary location based service-providing system 100 according to some embodiments. For example, the location based service-providing system 100 may be an online transportation service platform for transportation services such as taxi hailing, chauffeur services, delivery vehicles, carpool, bus service, driver hiring and shuttle services. The location based service-providing system 100 may include a server 110, a network 120, a requestor terminal 130, a provider terminal 140, a vehicle 150, and a database 160. The server 110 may include a processing engine 112.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the requestor terminal 130, the provider terminal 140, and/or the database 160 via the network 120. As another example, the server 110 may be directly connected to the requestor terminal 130, the provider terminal 140, and/or the database 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may have one or more components illustrated in FIG. 4 in the present disclosure.

In some embodiments, the server 110 may include a processing engine 112. The processing engine 112 may process information and/or data relating to the service request to perform one or more functions described in the present disclosure. For example, the processing engine 112 may determine reference information based on the service request obtained from the requestor terminal 130. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the location based service-providing system 100 (e.g., the server 110, the requestor terminal 130, the provider terminal 140, the vehicle 150, the database 160) may send information and/or data to other component(s) in the location based service-providing system 100 via the network 120. For example, the server 110 may obtain/acquire service request from the requestor terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . through which one or more components of the location based service-providing system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

The provider equipment 140 may include a plurality of driver equipments 140-1, 140-2, . . . , 140-3, 140-4. In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

In some embodiments, the provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one vehicle type. The vehicle types may include a taxi, a luxury car, an express car, a bus, a shuttle, etc.

The database 160 may store data and/or instructions. In some embodiments, the database 160 may store data obtained from the requestor terminal 130 and/or the provider terminal 140. In some embodiments, the database 160 may store data and/or instructions that the server 110 may execute or use to perform exemplary methods described in the present disclosure. In some embodiments, database 160 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the database 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 160 may be connected to the network 120 to communicate with one or more components in the location based service-providing system 100 (e.g., the server 110, the requestor terminal 130, the provider terminal 140, etc.). One or more components in the location based service-providing system 100 may access the data or instructions stored in the database 160 via the network 120. In some embodiments, the database 160 may be directly connected to or communicate with one or more components in the location based service-providing system 100 (e.g., the server 110, the requestor terminal 130, the provider terminal 140, etc.). In some embodiments, the database 160 may be part of the server 110.

In some embodiments, one or more components in the location based service-providing system 100 (e.g., the server 110, the requestor terminal 130, the provider terminal 140, etc.) may have permission to access the database 160. In some embodiments, one or more components in the location based service-providing system 100 may read and/or modify information relating to the requestor, provider, and/or the public when one or more conditions are met. For example, the server 110 may read and/or modify one or more users' information after a service is completed. As another example, the provider terminal 140 may access information relating to the requestor when receiving a service request from the requestor terminal 130, but the provider terminal 140 may not modify the relevant information of the requestor.

In some embodiments, information exchanging of one or more components in the location based service-providing system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the location based service-providing system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the requestor terminal 130 may generate electrical signals encoding the request. The processor of the requestor terminal 130 may then send the electrical signals to an output port. If the requestor terminal 130 communicates with the server 110 via a wired network, the output port may be physically connected to a cable, which further transmit the electrical signal to an input port of the server 110. If the requestor terminal 130 communicates with the server 110 via a wireless network, the output port of the requestor terminal 130 may be one or more antennas, which convert the electrical signal to electromagnetic signal. Similarly, a provider terminal 130 may process a task through operation of logic circuits in its processor, and receive an instruction and/or service request from the server 110 via electrical signal or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
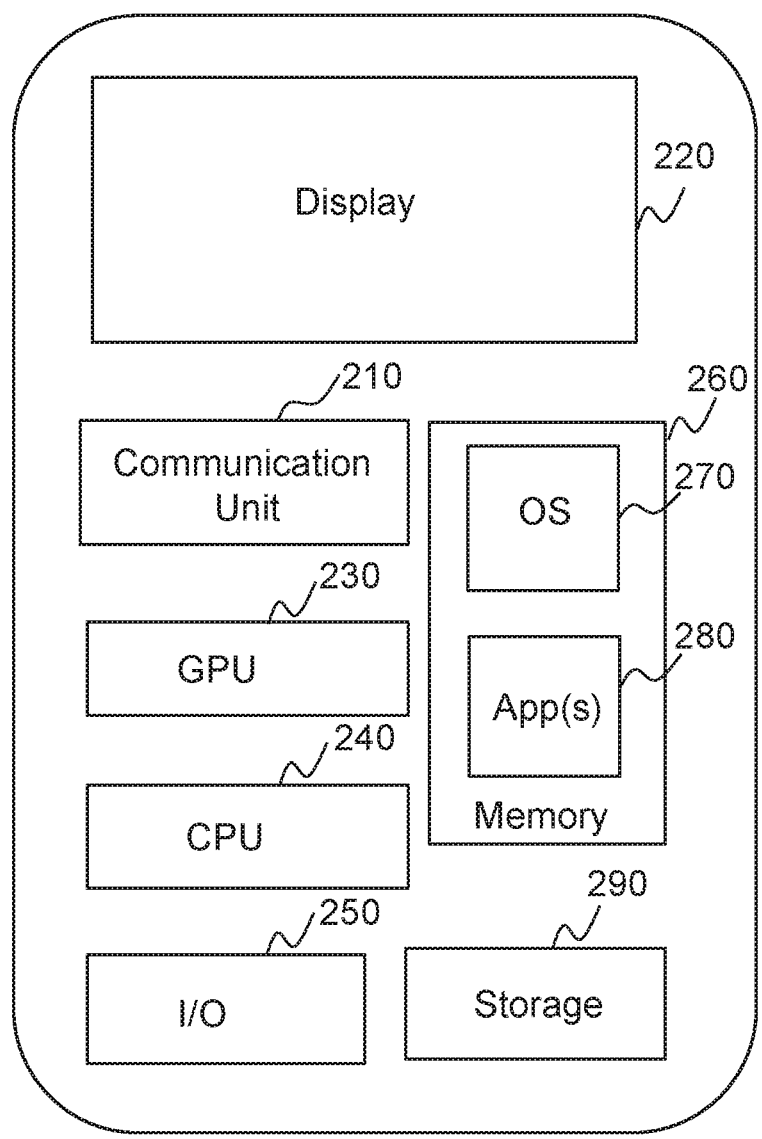
FIG. 2 depicts the architecture of a mobile device on which the present disclosure can be implemented.

FIG. 2 depicts the architecture of a mobile device on which the present disclosure can be implemented. In this example, the user device on which information relating to an order for service or other information from the scheduling system is presented and interacted-with is a mobile device 200, including but not limited to a smart phone, a tablet, a music player, a handled gaming console, a global positioning system (GPS) receiver, and a wearable computing device (e.g., eyeglasses, wrist watch, etc.), or in any other form factor. The mobile device 200 in this example includes a communication unit 210, such as a wireless communication antenna, a display 220, one or more graphic processing units (GPUs) 230, one or more central processing units (CPUs) 240, one or more input/output (I/O) devices 250, a memory 260, and storage 290. Any other suitable component, including but not limited to a system bus or a controller (not shown), may also be included in the mobile device 200. As shown in FIG. 2, a mobile operating system 270, e.g., iOS, Android, Windows Phone, etc., and one or more applications 280 may be loaded into the memory 260 from the storage 290 in order to be executed by the CPU 240. The applications 280 may include a browser or any other suitable mobile apps for receiving and rendering information relating to an order for service or other information from the location based service providing system on the mobile device 200. User interactions with the information stream may be achieved via the I/O devices 250 and provided to the location based service-providing system 100 and/or other components of the system 100, e.g., via the network.

To implement various modules, units, and their functionalities described in the present disclosure, computer hardware platforms may be used as the hardware platform(s) for one or more of the elements described herein (e.g., the location based service-providing system 100, and/or other components of the location based service-providing system 100 described with respect to FIGS. 1-8). The hardware elements, operating systems and programming languages of such computers are conventional in nature, and it is presumed that those skilled in the art are adequately familiar therewith to adapt those technologies to the management of the supply of service as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 3:
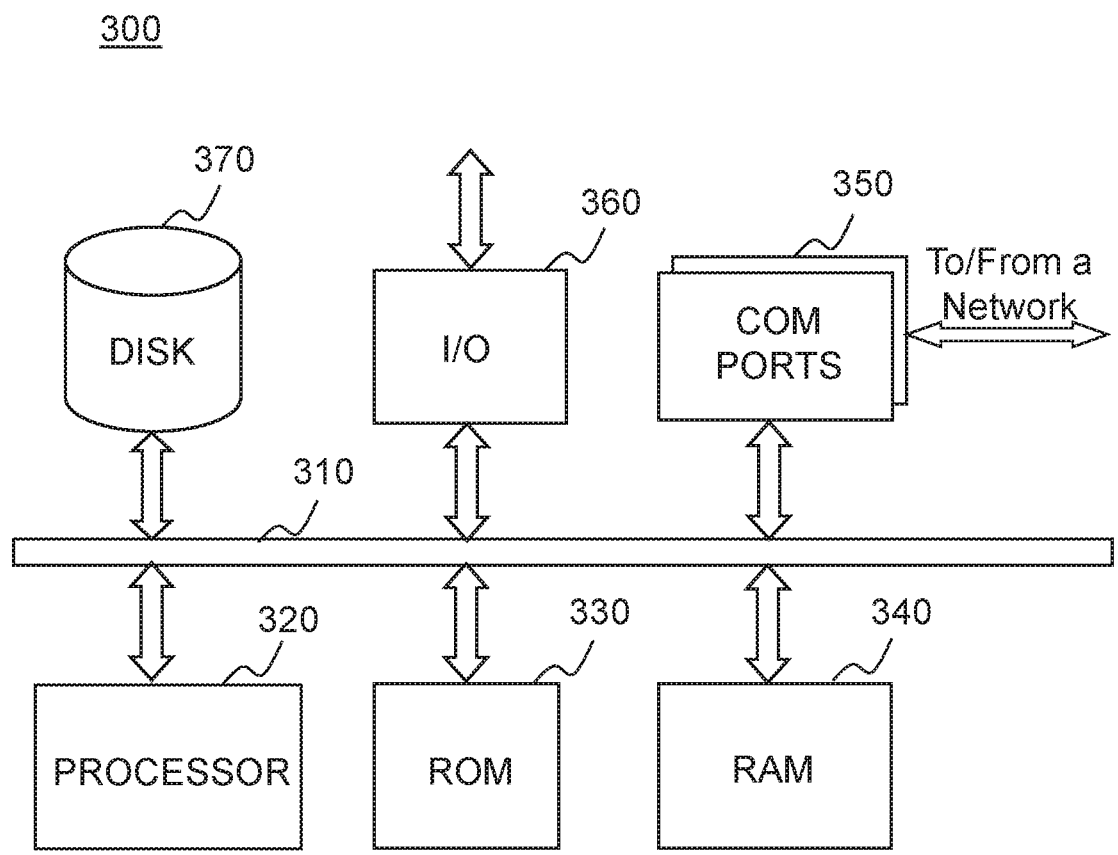
FIG. 3 is a schematic diagram illustrating an exemplary computing device according to some embodiments of the present disclosure.

FIG. 3 is a schematic diagram illustrating exemplary hardware and software components of a computing device 300 on which the server 110, the requestor terminal 130, and/or the provider terminal 140 may be implemented according to some embodiments of the present disclosure. For example, the processing engine 112 may be implemented on the computing device 300 and configured to perform functions of the processing engine 112 disclosed in this disclosure.

The computing device 300 may be a general-purpose computer or a special-purpose computer; both may be used to implement a location based service-providing system for the present disclosure. The computing device 300 may be used to implement any component of the location based service as described herein. For example, the processing engine 112 may be implemented on the computing device 300, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 300, for example, may include COM ports 350 connected to and from a network connected thereto to facilitate data communications. The computing device 300 may also include a processor (e.g., the processor 320), in the form of one or more processors (e.g., logic circuits), for executing program instructions. For example, the processor may include interface circuits and processing circuits therein. The interface circuits may be configured to receive electronic signals from a bus 310, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 310. The exemplary computer platform may include the bus 310, program storage and data storage of different forms, for example, a disk 370, and a read only memory (ROM) 330, or a random access memory (RAM) 340, for various data files to be processed and/or transmitted by the computer. The exemplary computer platform may also include program instructions stored in the ROM 330, RAM 340, and/or any other type of non-transitory storage medium to be executed by the processor 320. The methods and/or processes of the present disclosure may be implemented as the program instructions. The computing device 300 also includes an I/O component 360, supporting input/output between the computer and other components therein such as user interface elements 380. The computing device 300 may also receive programming and data via network communications.

Merely for illustration, only one processor is illustrated in the computing device 300. However, it should be noted that the computing device 300 in the present disclosure may also include multiple processors, thus operations and/or method steps that are performed by one processor as described in the present disclosure may also be jointly or separately performed by the multiple processors. For example, if in the present disclosure the processor of the computing device 300 executes both step A and step B, it should be understood that step A and step B may also be performed by two different processors jointly or separately in the computing device 300 (e.g., the first processor executes step A and the second processor executes step B, or the first and second processors jointly execute steps A and B).

Figure 4A:
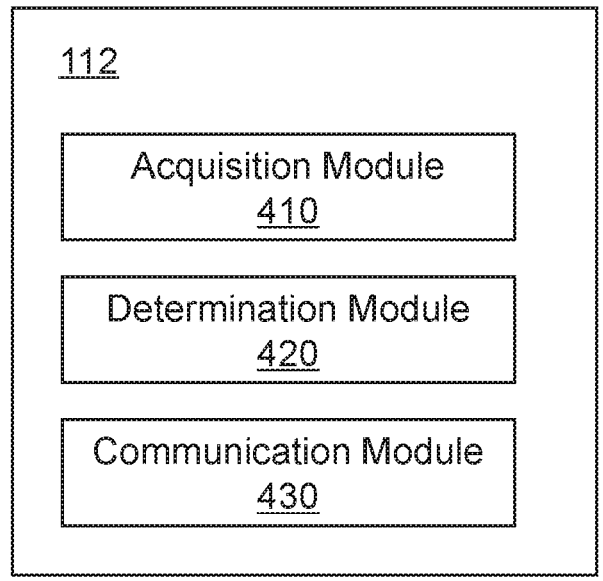
FIG. 4A is a block diagram illustrating an exemplary processing engine according to some embodiments of the present disclosure.
Figure 4B:
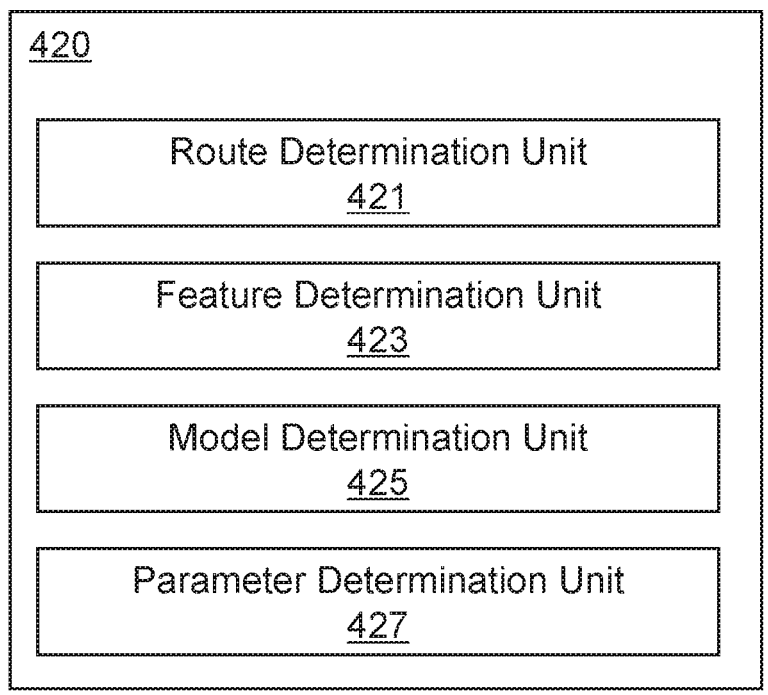
FIG. 4B is a block diagram illustrating an exemplary determination module according to some embodiments of the present disclosure.

FIG. 4A is a block diagram illustrating an exemplary processing engine 112 according to some embodiments of the present disclosure. FIG. 4B is a block diagram illustrating an exemplary determination module 420 according to some embodiments of the present disclosure.

As illustrated in FIG. 4A, the processing engine 112 may include an acquisition module 410, a determination module 420, and a communication module 430. As illustrated in FIG. 4B, the determination module 420 may include a route determination unit 421, a feature determination unit 423, a model determination unit 425 and a parameter determination unit 427.

The acquisition module 410 may be configured to obtain one or more service requests. The acquisition module 410 may obtain a service request from a terminal (e.g., the requestor terminal 130) via the network 120. In some embodiments, the service request may be a request for a transportation service. The service request may include but not limited to order information, user information, or the like, or any combination thereof.

The order information may include but not limited to a departure location, a start point, a destination, an end point, a departure time, an arrival time, an acceptable wait time, a number of passengers, luggage information, mileage information, a number of seats requested, a type of vehicle requested, whether have pets or not, user habit/preference (e.g., a vehicle type, a size of the trunk, a load of a vehicle, etc.), whether agreeing to share the transportation with others, or the like, or any combination thereof.

The user information may be the information associated with a requestor that requests for the transportation service. The user information may include but not limited to a name, a nickname, gender, a photo, a nationality, age, date of birth, contact information (a telephone number, a mobile phone number, social media account information (e.g., Wechat™ account, QQ™ account, Linkedin™, etc.), other ways through which the user may be contacted, etc.), location information (e.g., coordinate information, direction information, motion state information, etc.), an occupation, a rating, a usage time, or the like, or any combination thereof.

In some embodiments, the acquisition module 410 may also be configured to obtain one or more historical orders. The history orders may be stored in the database 160. The historical orders may include but not limited to historical order information, historical user information, or the like, or any combination thereof.

The historical order information may include but not limited to an order number, a departure location, a start point, a destination, an end point, a departure time, an arrival time, an acceptable wait time, a number of passengers, luggage information, mileage information, whether have pets or not, user habit/preference (e.g., a vehicle type, a size of the trunk, a load of a vehicle, etc.), whether sharing the transportation with others, a price, a price raised by a consumer, a price adjusted by a service provider, a price adjusted by a system, a reward usage condition, a term of payment (e.g., cash payment, debit card payment, online payment, remittance payment, etc.), an order completion status, a weather condition, an environment condition, a road condition (e.g., road closure due to security, road construction, or other reasons), a traffic condition, or the like, or any combination thereof.

The historical user information may be the information associated with a service requestor or a service provider of an order. The historical user information may include but not limited to a name, a nickname, gender, a photo, a nationality, age, data of birth, contact information (a telephone number, a mobile phone number, social media account information (e.g., Wechat™ account, QQ™ account, Linkedin™, etc.), other ways through which the user may be contacted, etc.), location information (e.g., coordinate information, direction information, motion state information, etc.), an occupation, a rating, a usage time, driving experience, a vehicle age, a vehicle type, a vehicle condition, a license plate number, a driving license number, a certification status, user habit/ preference, a feature for extra services (e.g., trunk size, panoramic sunroof, other extra features, etc.), or the like, or any combination thereof.

Figure 8:
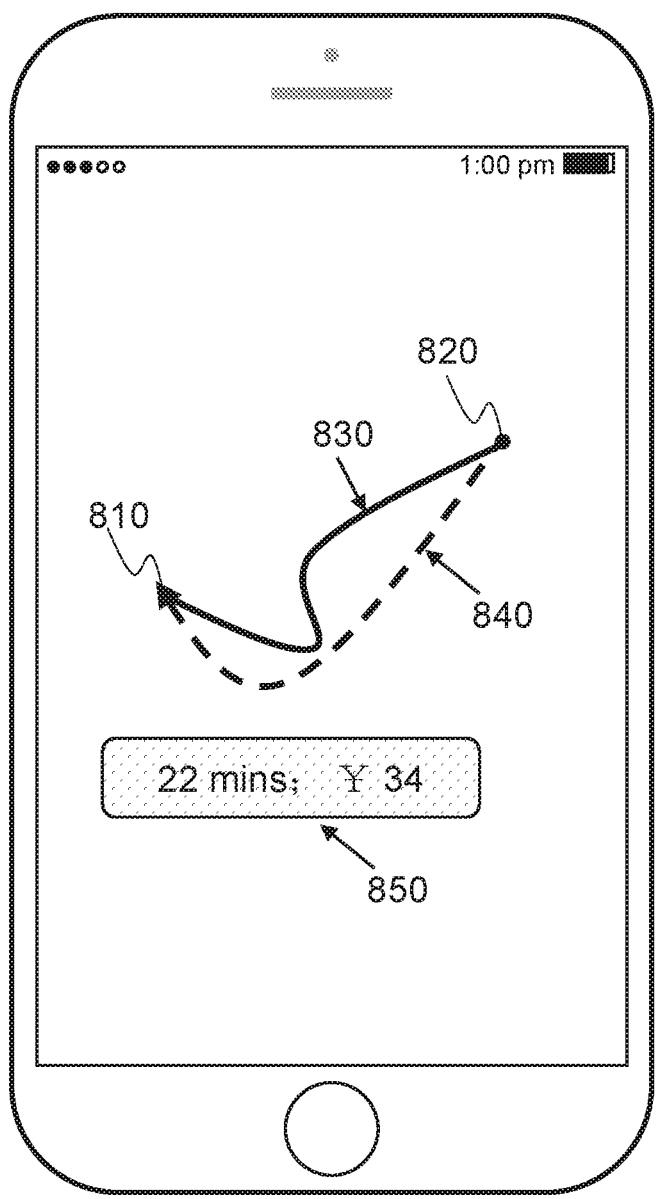
FIG. 8 is a schematic diagram illustrating an exemplary user interface for presenting an ETA and/or an estimated price according to some embodiments of the present disclosure.

The determination module 420 may be configured to determine a route based on the departure location and the destination of the service request. In particular, the route may be determined by the route determination unit 421. The route may be a travel path from a start point to an end point. The start point may be a picking up location of a passenger. The end point may be a drop-off location of the passenger. The route may be a planned route (a route 840 as shown in FIG. 8) or an actual route (a route 830 as shown in FIG. 8).

The determination module 420 may be configure to determine a feature associated with a route. In particular, the feature may be determined by the feature determination unit 423. The feature may include but not limited to a first feature associate with a first route, a second feature associate with a second route, a second historical feature associate with a second historical route, or the like, or any combination thereof. In some embodiments, the second feature may be determined based on the first feature. The feature may include but not limited to an order feature, a map feature, a driver feature, a traffic feature, a location feature, a time feature, or the like, or any combination thereof. More detail of the feature may be found in FIG. 5 and the related description.

The determination module 420 may further determine a model. In particular, the model may be determined by the model determination unit 425. The model may include but not limited to a transfer learning model, a machine learning model, or the like, or any combination thereof. The transfer learning model may be configured to determine a second feature associate with a second route (e.g., an estimated actual feature). The machine learning model may be configured to determine an estimated time of arrival (ETA) and/or an estimated price corresponding to the service request. In some embodiments, the transfer learning model and/or the machine learning model may be trained using a plurality of historical orders.

The determination module 420 may further determine an ETA and/or an estimated price corresponding to the service request. In particular, the ETA and/or the estimated price may be determined by the parameter determination unit 427. In some embodiments, the ETA and/or the estimated price may be determined based on the second feature and the machine learning model. Merely by way of example, the ETA and/or the estimated price may be determined by other models, including but not limited to a transfer learning model, a deep learning model, a data mining model, a neural network model, a linear fitting model, a nonlinear fitting model, or the like, or any combination thereof.

The communication module 430 may be configured to send the ETA and/or the estimated price to the terminal (e.g., the requestor terminal 130) via the network 120. In some embodiments, the ETA and/or the estimated price may be presented on the requestor terminal 130. The requestor terminal 130 may present the service request and/or the reference information using any suitable content, such as text, images, video content, audio content, graphics, etc.

In some embodiments, the communication module 430 may receive a response from the requestor terminal 130. The communication module 430 may also send the service request and/or any data related to the service request to one or more provider terminals.

It should be noted that the descriptions above in relation to the processing engine 112 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the model determination unit 425 may include a first determination sub-unit (not shown in figures) that may determine a transfer learning model and a second determination sub-unit (not shown in figures) that may determine a machine learning model. Similar modifications should fall within the scope of the present disclosure.

Figure 5:
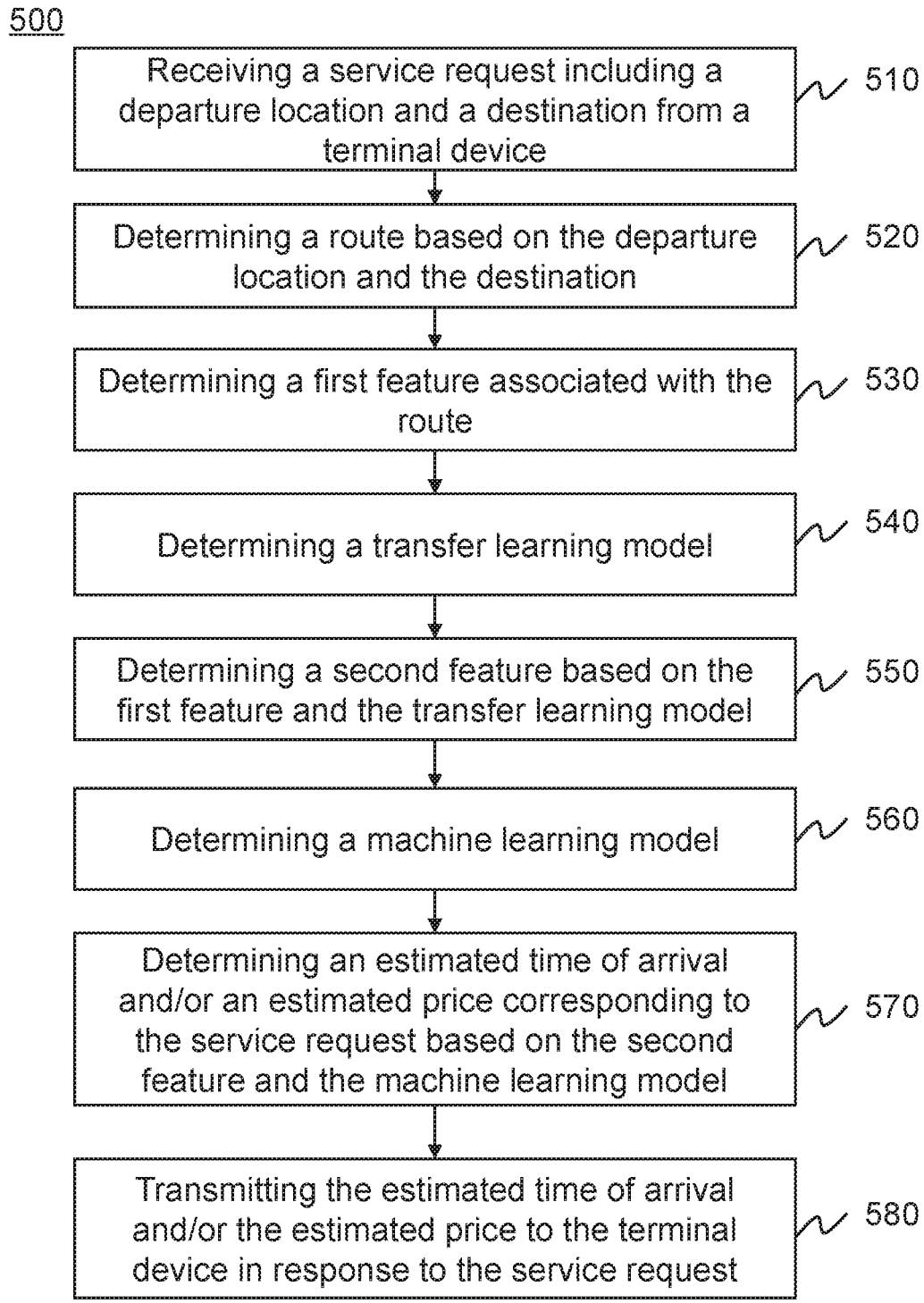
FIG. 5 is a flowchart illustrating an exemplary process for determining an ETA and/or an estimated price according to some embodiments of the present disclosure.

FIG. 5 is a flowchart illustrating an exemplary process and/or method 500 for determining an ETA and/or an estimated price according to some embodiments of the present disclosure. The process and/or method 500 may be executed by the location based service-providing system 100. For example, the process and/or method 500 may be implemented as a set of instructions (e.g., an application) stored in the storage ROM 330 or RAM 340. The processor 320 may execute the set of instructions and may accordingly be directed to perform the process and/or method 500.

In step 510, the processing engine 112 may receive a service request including a departure location and a destination from a terminal device. In particular, step 510 may be performed by the acquisition module 410 as shown in FIG. 4A.

The service request may be received from a requestor terminal (e.g., a requestor terminal 130 as described in connection with FIG. 1). The service request may be a request for any location based service. In some embodiments, the service request may be a request for a transportation service (e.g., a taxi service). The service request may be a real-time request, a reservation request, or the like, or any combination thereof. As used herein, the real-time request may include a service that the requestor expects to receive at the present moment or at a defined time reasonably close to the present moment for an ordinary person in the art. For example, a service request may be a real-time request if the defined time is within a time period from the present moment, such as within 5 minutes from the present moment, within 10 minutes from the present moment, or within 20 minutes from the present moment, etc. The reservation request may include a service that the requestor expects to receive at a future time from the present moment. For example, a service request may be a reservation request if the service is to be scheduled after a future time, which is in a defined time period later than the present moment. The defined time period may be 20 minutes after the present moment, 2 hours after the present moment, or 1 day after the present moment. In some embodiments, the processing engine 110 may define the real-time request or the reservation request based on a time threshold. The time threshold may be a default setting of the location based service-providing system 100, or may be adjustable depending on different situations. For example, in a traffic peak period, the time threshold may be set as relatively small (e.g., 10 minutes), while in an off-peak period (e.g., 10:00-12:00 am), the time threshold may be set as relatively large (e.g., 1 hour).

The service request may include a departure location and a destination. The departure location may be a current location of the terminal device (e.g., the requestor terminal 130). In some embodiments, the departure location may be a location different from the current location of the terminal device. For example, if a service is requested for a user other than the requestor (e.g., a friend or a relative of the requestor), the departure location may be a current location of the user or a location designated by the user. As another example, the departure location may be any location designated by the requestor. The departure location and/or the destination may be obtained by various ways, including but not limited to manual inputting through the requestor terminal 130, choosing according to historical inputting records, selecting according to the system recommendations, GPS technology, or the like, or any combination thereof. The departure location and/or the destination may be denoted as a description of a location, an address of the location, longitude and latitude coordinates of the location, a point corresponding to the location in a map, or the like, or any combination thereof.

In step 520, the processing engine 112 may determine a route based on the departure location and the destination. In particular, step 520 may be performed by the route determination unit 421 as shown in FIG. 4B.

The route may be a travel path from a start point (e.g., a location that a passenger boards in a vehicle) to an end point (e.g., a location that a passenger gets off a vehicle). The start point may correspond to the departure location. The start point and the departure location may be same or different. The end point may correspond to the destination. The end point and the destination may be same or different. For example, when the departure location and/or the destination is not accessible by a vehicle (e.g., a building, a square, a park), the start point may be a place near the departure location and/or the destination location.

In some embodiments, the route may be determined based on map data or navigation data. With the map data or the navigation data, one or more routes from the departure location to the destination may be determined. For example, a 2D map, a 3D map, a geographic map, an online map, a virtual map, or the like, may be used in determining the route.

The route may be determined based on a plurality of modeling languages. For example, the language may be a Stanford Research Institute Problem Solver (STRIPS) language, an Action Description Language (ADL), a Planning Domain Definition Language (PDDL), or the like, or any combination thereof.

The route may also be determined based on route planning techniques. The route planning techniques may include, for example, a machine learning technique, an artificial intelligence technique, a template approach technique, an artificial potential field technique, or the like, or any combination thereof. For example, an algorithm used in route planning may be a double direction A algorithm, an A* algorithm, a sample algorithm, or the like, or a combination thereof. In some embodiments, the route may be determined based on a plurality of routes completed in the historical orders. For example, if route A is determined as the most frequently used route from a departure location to a destination in multiple historical orders, route A may be recommended to the requestor as the route to travel from the same departure location to the same destination.

In some embodiments, one or more routes may be determined and recommended to the requestor, and one route may be selected from the one or more routes. The route selection may be performed by a user (e.g., the requestor of the requestor terminal 130) or the processing engine 110. In some embodiments, the route may be selected based on a time related criterion, a service cost related criterion, a path related criterion from the one or more routes. For example, the route may be selected as with a shortest mileage, a shortest time, a least service cost, or the like, among the one or more routes.

In step 530, the processing engine 112 may determine a first feature associated with the route. In particular, step 530 may be performed by the feature determination unit 423 as shown in FIG. 4B. The first feature may include but not limited to an order feature, a map feature, a driver feature, a traffic feature, or the like, or any combination thereof.

The order feature may be extracted from one or more orders associated with the route. For example, a start point of the order of a transportation service may be the same as a departure location of the route. The order feature may include but not limited to a departure location, a start point, a destination, an end point, a departure time, an arrival time, a number of passengers, luggage information, mileage information, a number of orders near the departure location of the route, an order density near the departure location of the route, or the like, or any combination thereof. For example, if a route is from the Tsinghua University to the National Library, the order feature may be the number of orders from the Tsinghua University to the National Library in the past one hour.

The map feature may be shown on a map relating to the route. The map may be a 3D (3 dimension) map or a 2D map. The information associated with the map may be updated in real time according to the current time and location. The map may be implemented in one or more mobile applications of the terminal device. The map feature may include but not limited to road information, traffic signal information, length of the route, or the like, or any combination thereof. The road information may include but not limited to a number of intersections, distribution of intersections, etc. For example, the map feature of a route from the Tsinghua University to the National Library may include 10 traffic signals and 6 intersections.

The driver feature may be the information associated with the driver near the departure location of the route. The driver feature may include but not limited to a number of the available drivers near a departure location, profile of the available drivers (e.g., habit/preference of the available drivers), types of vehicles corresponding to the available drivers, or the like, or any combination thereof. For example, a driver feature may indicate that there are 8 drivers available to take a service order near a departure location (Tsinghua University).

The traffic feature may be traffic information relating to the route. The traffic feature may include but not limited to a route linked sequence, width of the route, road condition of the route, vehicles information of the route, road congestion information, restrictions information, road repairing, traffic accidents, weather conditions, or the like, or any combination thereof. For example, the traffic feature may indicate that on the route from the Tsinghua University to the National Library, there is a traffic accident that causes the road jam.

In step 540, the processing engine 112 may determine a transfer learning model. In particular, the transfer learning model may be determined by the model determination unit 425 as shown in FIG. 4B.

Transfer learning may tackle the problem of predicting testing instances drawn from a different but related distribution compared with training instances. The transfer learning may include but not limited to inductive transfer learning, transductive transfer learning, unsupervised transfer learning, or the like. In the inductive transfer learning setting, the target task is different from the source task, no matter when the source and target domains are the same or not. In the transductive transfer learning setting, the source and target tasks are the same, while the source and target domains are different. In the unsupervised transfer learning setting, similar to inductive transfer learning setting, the target task is different from but related to the source task. However, the unsupervised transfer learning focus on solving unsupervised learning tasks in the target domain, such as clustering, dimensionality reduction, and density estimation. In this case, there are no labeled data available in both source and target domains in training.

According to the present disclosure, the transfer learning model may be applied for determining an estimated actual feature (e.g., the second feature) according to the route related feature (e.g., the first feature). The transfer learning model may be a large-scale deep learning model. The transfer learning model may be determined and/or trained according to historical orders. More detail of the transfer learning model may be found in FIG. 6 and the related description.

In step 550, the processing engine 112 may determine a second feature based on the first feature and the transfer learning model. In particular, step 550 may be performed by the feature determination unit 423 as shown in FIG. 4B.

The second feature may be an estimated actual feature relating to an estimated actual route. The second feature may include but not limited to a location feature, a time feature, a driver feature associated with the estimated actual route, a traffic feature associated with the estimated actual route, other features associated with the estimated actual route, or the like, or any combination thereof. The location feature may include but not limited to information of the departure location (or the start point), destination (or the end point), or the like, or any combination thereof. The time feature may include but not limited to time period, weekday, arrival time, or the like, or any combination thereof. The driver feature associated with the estimated actual route may include but not limited to driving preference, vehicle speed, whether a driver driving according to a navigation guide, or the like, or any combination thereof. The traffic feature associated with the estimated actual route may include but not limited to an actual driving route, the route linked sequence, length of the route, width of the route, road condition of the route (e.g., real time road condition such as vehicle volume, vehicle density, vehicle speed, etc.; non-real time road condition such as a number of traffic signal, one-way or two-way street, intersection information, etc.), vehicles information of the route, road congestion information, restrictions information, or the like, or any combination thereof. The other features associated with the estimated actual route may include but not limited to road repairing, traffic accidents, weather conditions, or the like, or any combination thereof.

In step 560, the processing engine 112 may determine a machine learning model. In particular, step 560 may be performed by the model determination unit 425 as shown in FIG. 4B.

The machine learning model may be a supervised learning model, unsupervised learning model and reinforcement learning model. In the supervised learning, the computer may be presented with example inputs and their desired outputs, given by a "teacher," and the goal may be to learn a general rule that maps inputs to outputs. In the unsupervised learning, no labels be given to the learning algorithm, leaving it on its own to find structure in its input. The unsupervised learning may be a goal in itself (discovering hidden patterns in data) or a means towards an end (feature learning). In the reinforcement learning, a computer program interacts with a dynamic environment in which it must perform a certain goal (such as driving a vehicle or playing a game against an opponent). The program may provide feedback in terms of rewards and punishments as it navigates its problem space. According to the present disclosure, the machine learning model may be configured to determine an estimated time of arrival and/or an estimated price based on the second feature. The machine learning model may be determined and/or trained according to historical orders. More detail of the machine learning model and the training of the machine learning model may be found in FIG. 7 and the related description.

In step 570, the processing engine 112 may determine an estimated time of arrival (ETA) and/or an estimated price corresponding to the service request based on the second feature and the machine learning model. In particular, step 570 may be performed by the parameter determination unit 427 as shown in FIG. 4B.

The ETA may be an estimated value of a time of arrival. The ETA may be denoted as a time period, a time point, or a combination thereof. As used herein, the ETA may be the time period spent on the route from the departure location to the destination. As another example, the ETA may also be the time point arriving to the destination. In some embodiments, the calculation of the ETA may begin with the current time or a designated time point. The estimated price may be a service cost that a service requester needs to pay to the service provider once the service is completed. As used herein, the estimated price may be determined based on features including but not limited to a mileage of the route, a time period spent on the route, a time slot in a day, weather condition, or the like, or any combination thereof. In some embodiments, the estimated price may be determined based on the estimated time of arrival.

In step 580, the processing engine 112 may transmit the estimated time of arrival and/or the estimated price to the terminal device (e.g., the requestor terminal 130) in response to the service request. In particular, step 580 may be performed by the communication module 430 as shown in FIG. 4A. With knowing the ETA and/or the estimated price, the service requestor can judge whether sending the service request or not.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 500. For another example, the step 560 may be omitted or be executed independently. As another example, the step 580 may be omitted or be executed independently. Merely for illustration, the ETA and/or the estimated price may be determined based on the first feature associated with the route and one or more historical orders. For example, if the route is similar to a route in a historical order, then the ETA and/or the estimated price may be determined as the time of arrival and/or the price of the historical order.

Figure 6:
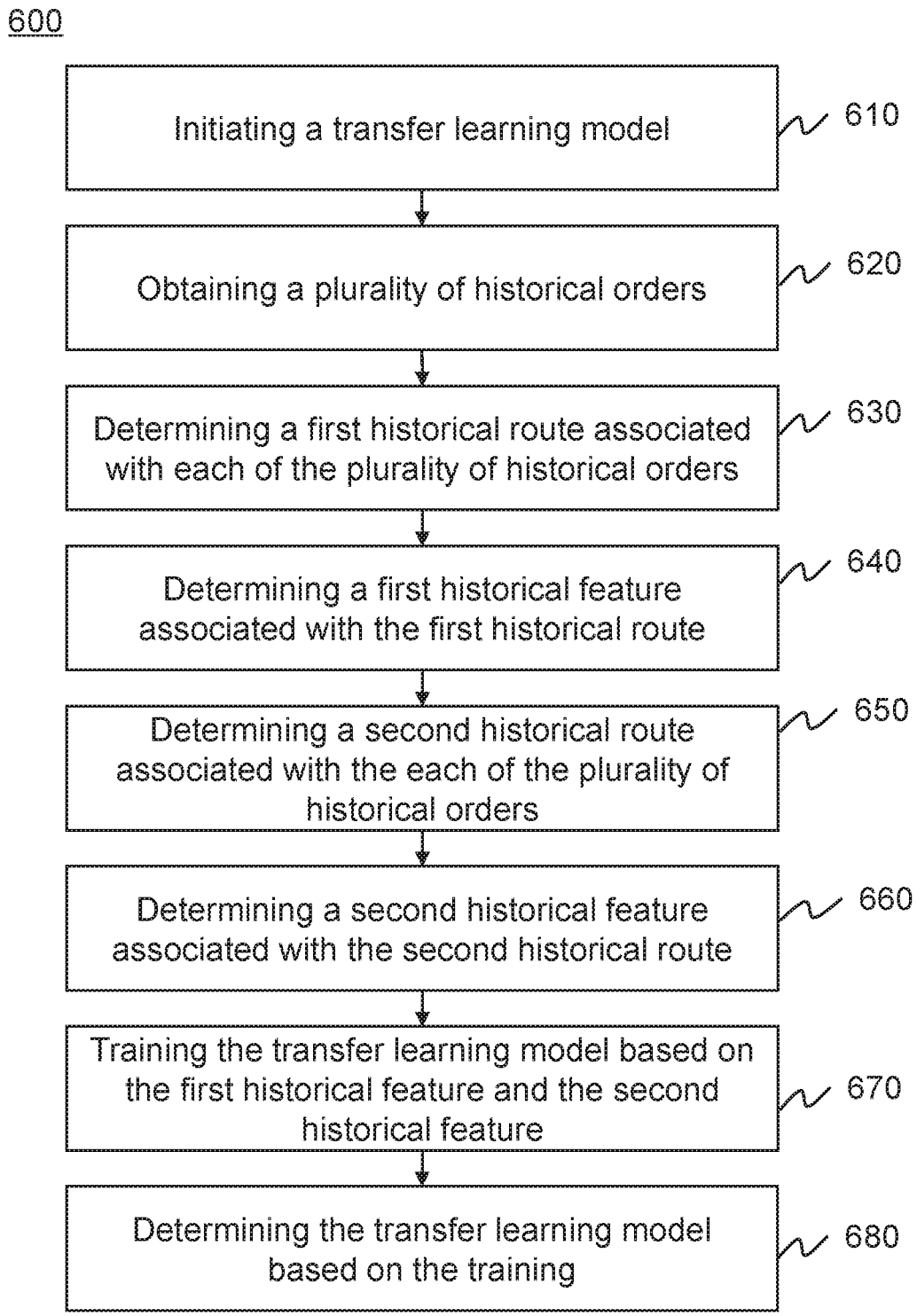
FIG. 6 is a flowchart illustrating an exemplary process for determining a transfer learning model according to some embodiments of the present disclosure.

FIG. 6 is a flowchart illustrating an exemplary process for determining a transfer learning model according to some embodiments of the present disclosure. The process and/or method 600 may be executed by the location based service-providing system 100. For example, the process and/or method 600 may be implemented as a set of instructions (e.g., an application) stored in the storage ROM 330 or RAM 340. The processor 320 may execute the set of instructions and may accordingly be directed to perform the process and/or method 600.

In step 610, the processing engine 112 may initiate a transfer learning model. In some embodiments, the transfer learning model may be stored in the storage ROM 330 or RAM 340. The transfer learning model may be a pre-trained model and have been used in processing the historical service request. In the alternative, the transfer learning model may include one or more parameters that need to be trained. As used herein, the transfer learning model may be defined as below: Given a source domain $D_S$ and learning task $T_S$, a target domain $D_T$ and learning task $T_T$, transfer learning aims to help improve the learning of the target predictive function $f_T(\cdot)$ in $D_T$ using the knowledge in $D_S$ and $T_S$, where $D_S \neq D_T$, or $T_S \neq T_T$.

A domain D consists of two components: a feature space $\chi$ and a marginal probability distribution $X=(x_1, \ldots x_n) \in \chi$, where $x_i$ is the ith term vector corresponding to some documents, and X is a particular learning sample. In general, if two domains are different, then they may have different feature spaces or different marginal probability distributions.

Given a specific domain, $D=\{\chi, P(X)\}$, a task consists of two components: a label space Y and an objective predictive function $f(\cdot)$ (denoted by $T=\{Y, f(\cdot)\}$), which is not observed but can be learned from the training data, which consist of pairs $\{x_i, y_i\}$, where $x_i \in X$ and $y_i \in Y$. The function $f(\cdot)$ can be used to predict the corresponding label, $f(x)$, of a new instance x. More specifically, the source domain data may be denoted as $$D_S = \{(x_{S_1}, y_{S_1}), \ldots, (x_{S_{n_S}}, y_{S_{n_S}})\},$$

wherein $x_{S_i} \in \chi_S$ is the data instance and $y_{S_i} \in Y_S$ is the corresponding class label. Similarly, the target-domain data may be denoted as $$T_S = \{(x_{T_1}, y_{T_1}), \ldots, (x_{T_{n_T}}, y_{T_{n_T}})\},$$

wherein the input $x_{T_i}$ is in $\chi_T$ and $y_{T_i} \in Y_T$ is the corresponding output. In most cases, $0 \leq n_T \leq n_S$.

In step 620, the processing engine 112 may obtain a plurality of historical orders. In particular, step 620 may be performed by the acquisition module 410 as shown in FIG. 4A. The orders may be stored in the database 160 or other storage (e.g., a storage in the requestor terminal 130). The orders may be obtained by the acquisition module 410 via the network 120.

In step 630, the processing engine 112 may determine a first historical route associated with each of the plurality of historical orders. In particular, the first historical route may be determined by the route determination unit 421 as shown in FIG. 4B.

The first historical route may be a planned route selected from one or more recommended routes by the on-demand service. The first historical route may be a planned travel path from a start point (e.g., a location that a passenger boards in a vehicle) to an end point (e.g., a location that a passenger gets off a vehicle). The start point may correspond to a departure location. The start point and the departure location may be same or different. The end point may correspond to a destination. The end point and the destination may be same or different. For example, when the departure location and/or the destination is not accessible by a vehicle (e.g., a building, a square, a park), the start point may be a place near the departure location and/or the destination location.

In some embodiments, the first historical route may be determined based on map data or navigation data. With the map data or the navigation data, one or more routes from the departure location to the destination may be determined. For example, a 2D map, a 3D map, a geographic map, an online map, a virtual map, or the like, may be used in determining the route.

The first historical route may be determined based on a plurality of modeling languages. For example, the language may be a Stanford Research Institute Problem Solver (STRIPS) language, an Action Description Language (ADL), a Planning Domain Definition Language (PDDL), or the like, or any combination thereof.

The first historical route may be determined based on route planning techniques. The route planning techniques may include, for example, a machine learning technique, an artificial intelligence technique, a template approach technique, an artificial potential field technique, or the like, or any combination thereof. For example, an algorithm used in route planning may be a double direction A algorithm, an A* algorithm, a sample algorithm, or the like, or a combination thereof.

In step 640, the processing engine 112 may determine a first historical feature associated with the first historical route. In particular, step 640 may be performed by the feature determination unit 423 as shown in FIG. 4B. The first historical feature may include but not limited to an order feature, a map feature, a driver feature, a traffic feature, or the like, or any combination thereof. The first historical feature may be similar to the first feature described in step 530 as shown in FIG. 5.

In step 650, the processing engine 112 may determine a second historical route associated with the each of the plurality of historical orders. In particular, step 650 may be performed by the route determination unit 421 as shown in FIG. 4B. The second historical route may be retrieved from data of the historical order.

In some embodiments, the second historical route may be an actual route in a historical order. As used herein, the actual route is the actual travel route associated with the historical order. The actual route and the planned route may be same or different. For example, a service provider of the historical order may drive along the planned route. As another example, a service provider of the historical order may not drive along the planned route but a route determined by himself/herself.

In step 660, the processing engine 112 may determine a second historical feature associated with the second historical route. In particular, step 660 may be performed by the feature determination unit 423 as shown in FIG. 4B. The second historical feature may be a feature relating to the second historical route. The second historical feature may be an actual feature relating to the actual route. For example, the second historical feature (or the actual feature) may include but not limited to a location feature, a time feature, a driver feature associated with the actual route, a traffic feature associated with the actual route, other features associated with the actual route, or the like, or any combination thereof. The second historical feature may be similar to the second feature described in step 550 as shown in FIG. 5.

In step 670, the processing engine 112 may train the transfer learning model based on the first historical feature and the second historical feature. In particular, step 670 may be performed by the model determination unit 425 as shown in FIG. 4B.

The transfer learning model may include one or more mapping rules. As used herein, the one or more mapping rules may be one or more relationships between the first historical feature and the second historical feature. In some embodiments, the one or more mapping rules may be used to determine a second feature based on a first feature. For example, if a first historical feature was A, a second historical feature was B, a mapping rule may be determined as A→B. The "→" may represent that there is a relationship (e.g., A may be equal to B or A may be a function of B) between A and B. Where A and/or B may include one or more features. In this case, if the first feature is A, then the second feature may be determined as B based on the first feature and the mapping rule.

In step 680, the processing engine 112 may determine the transfer learning model based on the training. The transfer learning model may be stored in the database 160 or other storage (e.g., ROM 330 or RAM 340). In some embodiments, the transfer learning model may be determined based on a spatial character. For example, the transfer learning model may be determined with respect to each city. The transfer learning model of multiple cities may be same as or different from each other. In some embodiments, the transfer learning model may be determined based on a temporal character. For example, the transfer learning model may be determined every month. In some embodiments, the transfer learning model may be determined based on a particular user group. For example, the transfer learning model may be determined based on a user group that is between twenty and forty years old.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 600. Specifically, a choosing operation may be added after step 620, so that only orders met a condition (e.g., a complete order, a well-received order) may be selected. A modifying operation (e.g., a denoising operation, a simplifying operation, etc.) may be added after step 670, so that the transfer learning model may be modified.

Figure 7:
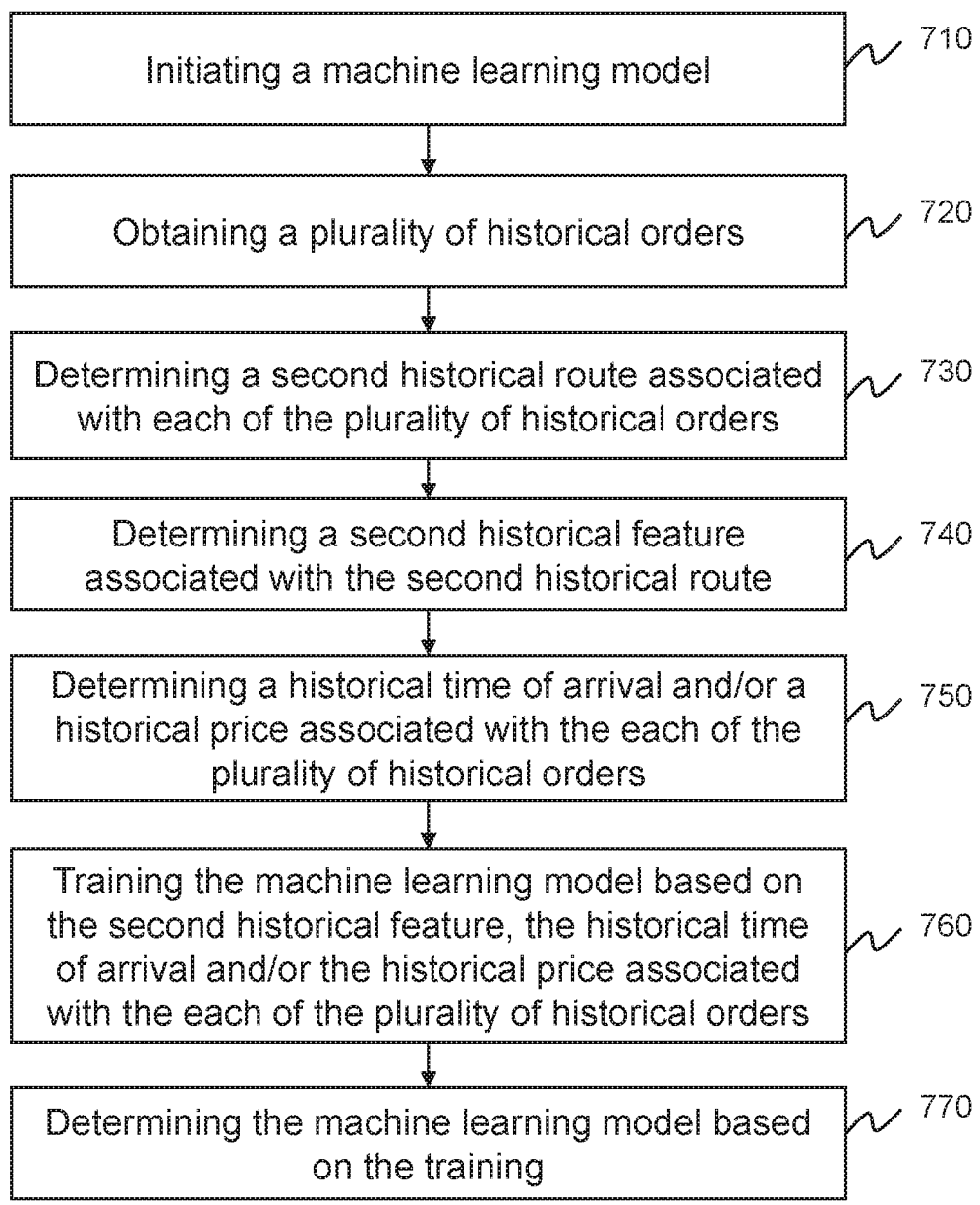
FIG. 7 is a flowchart illustrating an exemplary process for determining a machine learning model according to some embodiments of the present disclosure.

FIG. 7 is a flowchart illustrating an exemplary process for determining a machine learning model according to some embodiments of the present disclosure. The process and/or method 700 may be executed by the location based service-providing system 100. For example, the process and/or method 700 may be implemented as a set of instructions (e.g., an application) stored in the storage ROM 330 or RAM 340. The processor 320 may execute the set of instructions and may accordingly be directed to perform the process and/or method 700.

In step 710, the processing engine 112 may initiate a machine learning model. In some embodiments, the machine learning model may be stored in the storage ROM 330 or RAM 340.

In step 720, the processing engine 112 may obtain a plurality of historical orders. In particular, step 720 may be performed by the acquisition module 410 as shown in FIG. 4A. The historical orders may be stored in the database 160 or other storage (e.g., a storage in the requestor terminal 130). The orders may be obtained by the acquisition module 410 via the network 120. In some embodiments, the historical orders may be orders in a city, orders in a time period, orders of a vehicle type, or the like, or any combination thereof.

In step 730, the processing engine 112 may determine a second historical route associated with the each of the plurality of historical orders. The second historical route may be an actual route in a historical order. The second historical route may be retrieved from a storage (e.g., a database 160).

In step 740, the processing engine 112 may determine a second historical feature associated with the second historical route. In particular, step 660 may be performed by the feature determination unit 423 as shown in FIG. 4B. The second historical feature may be a feature relating to the second historical route. The second historical feature may be an actual feature relating to the actual route. For example, the second historical feature (or the actual feature) may include but not limited to a location feature, a time feature, a driver feature associated with the actual route, a traffic feature associated with the actual route, other features associated with the actual route, or the like, or any combination thereof. The second historical feature may be similar to the second feature described in step 550 as shown in FIG. 5.

In step 750, the processing engine 112 may determine a historical time of arrival and/or a historical price associated with the each of the plurality of historical orders. The historical time of arrival may be a value of a time of arrival. The historical time of arrival may be denoted as a time period, a time point, or a combination thereof. For example, the historical time of arrival may be the time period spent on the route from the departure location to the destination. As another example, the historical time of arrival may also be the time point arriving to the destination. The historical price may be a service fee that a service requester paid to the service provider when the service was completed. For example, if a historical order from the Tsinghua University to the National Library took 70 minutes and cost 147 Yuan, then the historical time of arrival associated with the order may be 70 minutes and the historical price may be 147 Yuan.

In step 760, the processing engine 112 may train the machine learning model based on the second historical feature, the historical time of arrival and/or the historical price associated with the each of the plurality of historical orders. In particular, step 760 may be performed by the model determination unit 425 as shown in FIG. 4B.

In some embodiments, the machine learning model may include one or more determining rules. As used herein, the one or more determining rules may be one or more relationships between the second historical feature and the historical time of arrival or the historical price. The one or more determining rules may be used to determine an ETA and/or an estimated price based on a second feature. For example, a second feature may be a road congestion indicator, one of the determining rules may be the ETA and/or an estimated price may be proportionate to the larger the road congestion indicator. In some embodiments, the machine learning model may be trained by a training algorithm. The training algorithm may include but not limited to FM (Factorization Machine), GBDT (Gradient Boosting Decision Tree), neural network, deep neural networks, artificial neural networks, Back-Propagation neural network, genetic algorithm, ant colony algorithm, particle swarm optimization, bee colony algorithm, or the like, or any combination thereof.

In step 770, the machine learning model based on the training may be determined. The machine learning model may be stored in the database 160 or other storage (e.g., ROM 330 or RAM 340). In some embodiments, the machine learning model may be determined based on a spatial character. For example, the machine learning model may be determined with respect to each city. The machine learning model of multiple cities may be same as or different from each other. In some embodiments, the machine learning model may be determined based on a temporal character. For example, the machine learning model may be determined every month. In some embodiments, the machine learning model may be determined based on a particular user group. For example, the machine learning model may be determined based on a user group that is between twenty and forty years old.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process/method 700. Particularly, after step 770, each feature may be allocated a weight according to its significance and/or dependency in the determination of the machine learning model. For another example, two models may be trained in step 760, one of which may be a machine learning model for time, and the other may be a model for price.

FIG. 8 is a schematic diagram illustrating an exemplary user interface for presenting an ETA and/or an estimated price according to some embodiments of the present disclosure. The user interface may be presented by one or more terminals (e.g., a provider terminal, a requestor terminal, etc.). The user interface may include one or more user interface elements (also referred to as the "UI elements") for presenting information related to the service request (e.g., traffic information, weather information, time information, locational information, price information, etc.). Each of the UI elements may be and/or include, for example, one or more buttons, icons, checkboxes, message boxes, text fields, data fields, search fields, etc.

For example, as illustrated in FIG. 8, the user interface 800 may include a dotted line 840 for presenting a planned route between a start point (e.g., a departure location) 820 and an end point (e.g., a destination) 810. The planned route may be selected from more than one recommended routes (not shown in figures). The user interface 800 may also include a solid line 830 for presenting an actual route (e.g., an actual route in a historical order) between the start point 820 and the end point 810. Further, the user interface may include a UI element 850 for presenting time information and/or price information related to the service request. For example, the time information may be presented as an ETA (e.g., 22 mins). The price information may be presented as an estimated price (e.g., ¥34). In some embodiments, the text fields of the UI element 850 may be selected, and detail information may be presented. The detail information may include but not limited to mileage, estimated waiting time, price per kilometer, additional charge, service charge, or the like, or any combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system configured to determine estimated time of arrival, comprising:
    at least one computer-readable storage medium storing a set of instructions for managing supply of services, map information, and a plurality of historical orders; and
    at least one processor in communication with the at least one storage medium, wherein when executing the set of instructions, the at least one processor is directed to:
        receive a service request including a departure location and a destination from a terminal device via a network;
        determine a route based on the map information, the departure location and the destination;
        determine a first feature associated with the route, the first feature including at least one of: an order feature, a map feature, a driver feature, or a traffic feature;
        determine a transfer learning model by:
            obtaining the plurality of historical orders from the storage medium;
            for each of the plurality of historical orders,
                determining a first historical route associated with the each of the plurality of historical orders based on the map information, the first historical route being a planned route of the each of the plurality of historical orders;
                determining a first historical feature associated with the first historical route;
                determining a second historical route associated with the each of the plurality of historical orders, the second historical route being an actual route of the each of the plurality of historical orders, the first historical route and the second historical route of at least one historical order being different;
                determining a second historical feature associated with the second historical route; and
            training the transfer learning model based on the first historical feature and the second historical feature;
        input the first feature into the transfer learning model that has been trained;
        determine a second feature based on an output of the transfer learning model, the second feature being an estimated actual feature relating to an estimated actual route;
        determine a machine learning model;
        input the second feature into the machine learning model;
        determine an estimated time of arrival based on an output of the machine learning model; and
        transmit the estimated time of arrival to the terminal device in response to the service request via the network.

2. The system of claim 1, wherein determine the machine learning model further comprises:
    determine a historical time of arrival associated with the each of the plurality of historical orders; and
    train the machine learning model based on the second historical feature, the historical time of arrival associated with the each of the plurality of historical orders; and
    determine the machine learning model based on the training.

3. The system of claim 1, the at least one processor is directed to:
    determine an estimated price based on the second feature.

4. The system of claim 3, wherein determine the first estimated price based on the second feature further comprises:
    determine the estimated price based on the second feature and the machine learning model.

5. The system of claim 4, wherein the at least one processor is further directed to:
    transmit the estimated price to the terminal device in response to the service request via the network;
    receive an instruction indicating whether the service request is sent or not from the terminal device.

6. The system of claim 1, the second feature includes at least one of:
    a location feature,
    a time feature,
    a driver feature, or
    a traffic feature.

7. The system of claim 1, wherein the at least one processor is further directed to:
    determine one or more routes based on the map information, the departure location and the destination;
    recommend the one or more routes to the terminal device;
    receive one of the one or more routes selected by the terminal device.

8. The system of claim 1, wherein the transfer learning model and the machine learning model are determined based on a spatial character, a temporal character, or a particular user group.

9. A method for determining an estimated time of arrival implemented on at least one device each of which has at least one processor, storage and a communication platform to connect to a network, the method comprising:
- receiving, by the at least one processor, a service request including a departure location and a destination from a terminal device via a network;
- determining, by the at least one processor, a route based on the map information, the departure location and the destination;
- determining, by the at least one processor, a first feature associated with the route, the first feature including at least one of: an order feature, a map feature, a driver feature, or a traffic feature;
- determining, by the at least one processor, a transfer learning model by:
  - obtaining a plurality of historical orders from the storage;
  - for each of the plurality of historical orders,
    - determining a first historical route associated with the each of the plurality of historical orders based on the map information, the first historical route being a planned route of the each of the plurality of historical orders;
    - determining a first historical feature associated with the first historical route;
    - determining a second historical route associated with the each of the plurality of historical orders, the second historical route being an actual route of the each of the plurality of historical orders, the first historical route and the second historical route of at least one historical order being different;
    - determining a second historical feature associated with the second historical route; and
    - training the transfer learning model based on the first historical feature and the second historical feature;
- inputting, by the at least one processor, the first feature into the transfer learning model that has been trained;
- determining, by the at least one processor, a second feature based on an output of the transfer learning model, the second feature being an estimated actual feature relating to an estimated actual route;
- determining, by the at least one processor, a machine learning model;
- inputting, by the at least one processor, the second feature into the machine learning model;
- determining, by the at least one processor, an estimated time of arrival based on an output of the machine learning model; and
- transmitting, by the at least one processor, the estimated time of arrival to the terminal device in response to the service request via the network.

10. The method of claim 9, wherein determining, by the at least one processor, the machine learning model further comprises:
- determining a historical time of arrival associated with the each of the plurality of historical orders; and
- training the machine learning model based on the second historical feature, the historical time of arrival associated with the each of the plurality of historical orders; and
- determining the machine learning model based on the training.

11. The method of claim 9, further comprising:
determining, by the at least one processor, an estimated price based on the second feature.

12. The method of claim 11, wherein determining, by the at least one processor, the first estimated price based on the second feature further comprises:
determining, by the at least one processor, the estimated price based on the second feature and the machine learning model.

13. The method of claim 12, wherein further comprises:
- transmitting the estimated price to the terminal device in response to the service request via the network;
- receiving an instruction indicating whether the service request is sent or not from the terminal device.

14. The method of claim 9, the second feature includes at least one of:
- a location feature,
- a time feature,
- a driver feature, or
- a traffic feature.

15. The method of claim 9, wherein further comprises:
- determining one or more routes based on the map information, the departure location and the destination;
- recommending the one or more routes to the terminal device;
- receiving one of the one or more routes selected by the terminal device.

16. The method of claim 9, wherein the transfer learning model and the machine learning model are determined based on a spatial character, a temporal character, or a particular user group.

17. A non-transitory machine-readable medium having information recorded thereon for determining an estimated time of arrival, wherein the information, when read by the machine, causes the machine to perform the following:
- receiving a service request including a departure location and a destination from a terminal device via a network;
- determining a route based on the map information, the departure location and the destination;
- determining a first feature associated with the route, the first feature including at least one of: an order feature, a map feature, a driver feature, or a traffic feature;
- determining a transfer learning model by:
  - obtaining a plurality of historical orders;
  - for each of the plurality of historical orders,
    - determining a first historical route associated with the each of the plurality of historical orders based on the map information, the first historical route being a planned route of the each of the plurality of historical orders;
    - determining a first historical feature associated with the first historical route;
    - determining a second historical route associated with the each of the plurality of historical orders, the second historical route being an actual route of the each of the plurality of historical orders, the first historical route and the second historical route of at least one historical order being different;
    - determining a second historical feature associated with the second historical route; and
    - training the transfer learning model based on the first historical feature and the second historical feature;
- input the first feature into the transfer learning model that has been trained;
- determining a second feature based on an output of the transfer learning model, the second feature being an estimated actual feature relating to an estimated actual route;
- determine a machine learning model;
- input the second feature into the machine learning model;

determining an estimated time of arrival based on an output of the machine learning model; and transmit the estimated time of arrival to the terminal device in response to the service request via a network.

* * * * *